(12) United States Patent
Junge et al.

(10) Patent No.: US 10,711,665 B2
(45) Date of Patent: Jul. 14, 2020

(54) METHOD FOR ASSEMBLING A CAMSHAFT IN A MODULE BODY

(71) Applicants: THYSSENKRUPP PRESTA TECCENTER AG, Eschen (LI); thyssenkrupp AG, Essen (DE)

(72) Inventors: Volker Junge, Wernigerode (DE); Kevin Wöhler, Ilsenburg (DE); Merlin Depta, Sarstedt (DE); Michael Fricke, Harsleben (DE); Thomas Rogatsch, Feldkirch (AT); Marko Curlic, Schaanwald (LI); Falk Heitling, Essen (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 336 days.

(21) Appl. No.: 15/546,237

(22) PCT Filed: Nov. 5, 2015

(86) PCT No.: PCT/EP2015/075808
§ 371 (c)(1),
(2) Date: Jul. 25, 2017

(87) PCT Pub. No.: WO2016/119934
PCT Pub. Date: Aug. 4, 2016

(65) Prior Publication Data
US 2018/0030863 A1    Feb. 1, 2018

(30) Foreign Application Priority Data
Jan. 29, 2015   (DE) .................. 10 2015 101 295

(51) Int. Cl.
*F01L 1/047* (2006.01)
*F01L 13/00* (2006.01)
*F16C 32/00* (2006.01)

(52) U.S. Cl.
CPC .......... *F01L 13/0036* (2013.01); *F01L 1/047* (2013.01); *F16C 32/00* (2013.01); *F01L 2013/0052* (2013.01)

(58) Field of Classification Search
CPC .............. F01L 13/0036; F01L 1/047; F01L 2013/0052; F01L 1/053; F01L 1/267;
(Continued)

(56) References Cited

U.S. PATENT DOCUMENTS

| 2012/0024245 A1* | 2/2012 | Nendel | F01L 13/0036 123/90.6 |
| 2013/0000442 A1* | 1/2013 | Wiesner | F01L 13/0036 74/567 |

(Continued)

FOREIGN PATENT DOCUMENTS

| CN | 1922389 A | 2/2007 |
| CN | 101128677 A | 2/2008 |

(Continued)

OTHER PUBLICATIONS

English translation of International Search Report issued in PCT/EP2015/075808, dated Jan. 18, 2016 (dated Jan. 29, 2016).

(Continued)

*Primary Examiner* — Devon C Kramer
*Assistant Examiner* — Kelsey L Stanek
(74) *Attorney, Agent, or Firm* — thyssenkrupp North America, LLC

(57) ABSTRACT

A camshaft may comprise a main shaft, on which at least two sliding cam pieces are accommodated in a rotationally fixed and axially displaceable manner, wherein the sliding cam (Continued)

pieces each comprise a carrier tube, on which are seated cam groups each comprising at least two cam tracks for valve-control purposes, as well as an adjustment element that can be brought into operative connection with an actuator for axial displacement of the two sliding cam pieces. A method for assembling such a camshaft may involve providing a module body with bearing bridges that receive the camshaft in a rotatable manner, inserting a first sliding cam piece into a first bearing bridge, connecting the first sliding cam piece to the adjustment element, inserting a second sliding cam piece into a second bearing bridge, and connecting the second sliding cam piece to the adjustment element with the aid of an axial adjustment distance of at least one of the sliding cam pieces in the bearing bridges.

19 Claims, 3 Drawing Sheets

(58) Field of Classification Search
CPC ..... F01L 1/46; F01L 2001/0473; F16C 32/00; B21D 53/845; B23P 11/02
USPC ............................................ 123/90.15–90.18
See application file for complete search history.

(56) References Cited

U.S. PATENT DOCUMENTS

| | | | | |
|---|---|---|---|---|
| 2013/0283613 | A1* | 10/2013 | Walter | ................. B21D 53/845 |
| | | | | 29/888.06 |
| 2016/0108764 | A1* | 4/2016 | Leutert | ................... F01L 1/047 |
| | | | | 123/90.6 |
| 2017/0023118 | A1 | 1/2017 | Kim | |
| 2017/0314425 | A1* | 11/2017 | Meusel | ............... F01L 13/0036 |
| 2017/0321578 | A1* | 11/2017 | Muster | ................ F01L 13/0036 |

FOREIGN PATENT DOCUMENTS

| | | | | |
|---|---|---|---|---|
| CN | 103688027 | A | 3/2014 | |
| DE | 102004022849 | A | 12/2005 | |
| DE | 102007016209 | A | 10/2008 | |
| DE | 102007027979 | A | 1/2009 | |
| DE | 102007037358 | A | 2/2009 | |
| DE | 102007037358 | A1 * | 2/2009 | .............. F01L 1/047 |
| DE | 102010004591 | A | 7/2011 | |
| DE | 102009059712 | A | 9/2011 | |
| DE | 102010020035 | A | 11/2011 | |
| DE | 102011111580 | A | 2/2013 | |
| DE | 102012105795 | A | 1/2014 | |
| DE | 102013006796 | A | 10/2014 | |
| DE | 102013006796 | A1 * | 10/2014 | .......... F01L 13/0036 |
| DE | 102013009757 | A | 12/2014 | |
| DE | 102015210080 | A1 * | 12/2016 | .............. F01L 1/047 |
| JP | 2006520869 | A | 9/2006 | |
| JP | 2010525244 | A | 7/2010 | |
| JP | 2013060858 | A | 4/2013 | |
| JP | 2016518547 | A | 6/2016 | |
| WO | 2011072782 | A | 6/2011 | |

OTHER PUBLICATIONS

English abstract of DE102010004591A.
English abstract of DE102010020035A.
English abstract of DE102012105795A.
English abstract of DE102013009757A.

* cited by examiner ly displaceable manner. A module body has at least two bearing bridges with closed bearing passages. At least two sliding cam pieces are introduced into the module body, and the main shaft is inserted through the sliding cam pieces by way of an axial movement.

METHOD FOR ASSEMBLING A CAMSHAFT IN A MODULE BODY

CROSS REFERENCE TO RELATED APPLICATIONS

This application is a U.S. National Stage Entry of International Patent Application Serial Number PCT/EP2015/075808, filed Nov. 5, 2015, which claims priority to German Patent Application No. DE 10 2015 101 295.2 filed Jan. 29, 2015, the entire contents of both of which are incorporated herein by reference.

FIELD

The present disclosure generally relates to camshafts, including methods for assembling camshafts.

BACKGROUND

DE 10 2012 105 795 A1 discloses a camshaft having two sliding cam pieces which are accommodated on a main shaft in a rotationally fixed and axially displaceable manner. In order for the sliding cam pieces to be accommodated in a rotationally fixed manner, they have an inner toothing formation, which interacts with an outer longitudinal toothing formation on the main shaft. The two sliding cam pieces have arranged between them an adjustment element which, for the axial displacement of the two sliding cam pieces, can be brought into operative connection with an actuator. The actuator, for this purpose, has guide elements which can engage, by way of a lift movement, in associated lift curves provided on the outside of the adjustment element. Axial displacement of the sliding cam pieces allows various cam tracks of the cam groups to interact with tappet elements, which serve for valve-control purposes in an internal combustion engine. The cam tracks can have different contours, for example it is conceivable for one cam track to be provided for a large valve lift and a further cam track to be provided for a small valve lift or for a zero lift. Depending on the axial position of the sliding cam pieces, it is therefore the case that valve control is operated by way of different valve lifts, but also, or as an alternative, by way of different control periods over the course of camshaft rotation.

The first sliding cam piece shown serves for controlling valves which are assigned to a first cylinder, and the further sliding cam piece serves for controlling valves which are assigned to a second, adjacent cylinder. It is therefore advantageously possible for just one adjustment element in operative connection with just one actuator to activate two sliding cam pieces for controlling the valves of different cylinders.

The disadvantage is that the sliding cam pieces and the adjustment element form a structural unit of considerable length in the center-axis direction of the main shaft. In the case of assembling, the insertion of the camshaft into a module body is therefore possible only by way of bearing bridges which have a split, and therefore open, construction. A module body in the present context is understood to be an accommodating body which is designed, for example, in the form of a hood, of a cover or as some other unit which is arranged on an internal combustion engine and is positioned, in particular, on a cylinder head of an internal combustion engine. The camshaft is set up ready for functioning in said accommodating body.

The definitively made camshaft together with the sliding cam pieces, the adjustment element and possibly also with the main shaft already introduced are thus inserted into the bearing bridges in the module body, and only then are the bearing bridges completed by being assembled with closed bearing passages, and therefore outer bearing shells, which are formed by the bearing bridges, enclose the camshaft over the full circumference only following assembly. It is usually the case here that the sliding cam pieces extend through the bearing bridges and are mounted in the same, and therefore, in addition to a guiding function, the main shaft serves just for introducing the rotary movement into the sliding cam pieces. Closed bearing passages here, within the context of the present invention, are not divided in two, for example formed from two bearing shells which in the installed state supplement one another to form a bearing bore. It is therefore necessary for a shaft, in order to be accommodated in a closed bearing bridge, to be introduced into the bearing bore of the bearing bridge by way of an axial insertion movement. The advantage of a closed bearing bridge here resides, by contrast, in lower production outlay.

DETAILED DESCRIPTION

Figure 1:
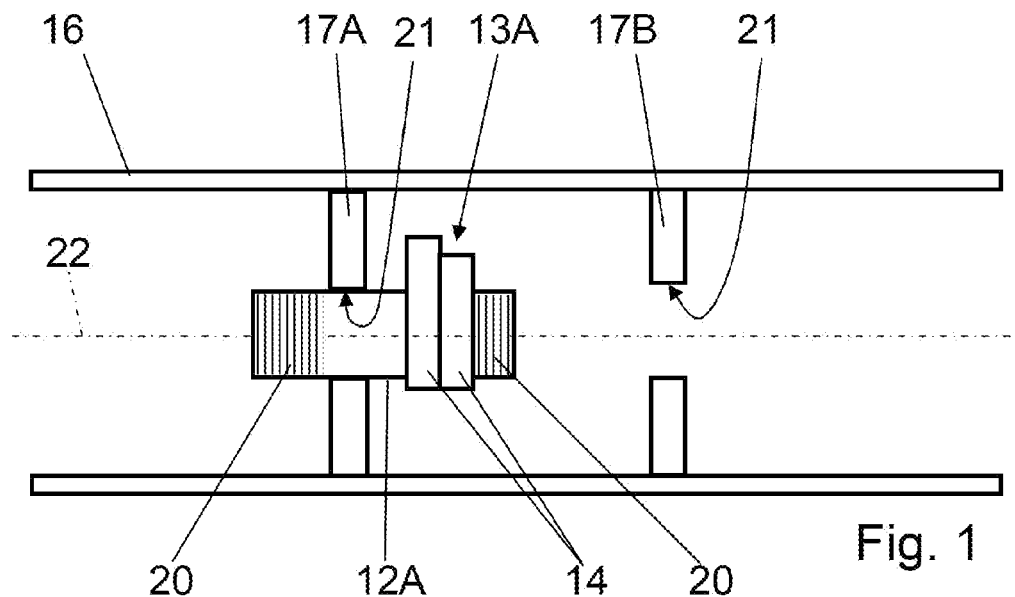
FIG. 1 is a schematic view of an example module body that has two bearing bridges, wherein a first carrier tube with a first cam group is inserted into a first bearing bridge.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a method for assembling a camshaft, wherein the camshaft comprises a main shaft, on which at least two sliding cam pieces are accommodated in a rotationally fixed and axially displaceable manner, wherein the sliding cam pieces each comprise a carrier tube, on which are seated cam groups each comprising at least two cam tracks for valve-control purposes, and wherein an adjustment element is provided and, for the axial displacement of the two sliding cam pieces, can be brought into operative connection with an actuator.

It is an object of the invention to develop a method for assembling a camshaft which has a main shaft and sliding cam pieces accommodated on the main shaft, wherein at least two sliding cam pieces should be capable of being displaced in the axial direction of the main shaft via an adjustment element, and wherein the camshaft should be capable of being assembled in a module body which has closed bearing bridges.

According to the invention, the method for assembling the camshaft comprises at least the following steps in any desired order: supplying a module body which has bearing bridges for accommodating the camshaft in a rotatable manner, inserting a first sliding cam piece into a first bearing bridge, connecting the first sliding cam piece to the adjustment element, inserting a second sliding cam piece into a second bearing bridge, and connecting the second sliding cam piece to the adjustment element, making use in the process of an axial adjustment distance of at least one of the sliding cam pieces in the bearing bridges.

The invention proceeds from the concept of using a module body which has closed bearing bridges, and the sliding cam pieces should be inserted into said bearing bridges by a corresponding method having a particular sequence of method steps. It is only then, or as an interim step, that the adjustment element is attached to one of the sliding cam pieces, and thereafter the second sliding cam piece is connected to the adjustment element from an opposite side to the first sliding cam piece. This gives rise to a method for assembling a camshaft in which the camshaft can be assembled in a module body which has closed bearing bridges, and two sliding cam pieces are attached to an adjustment element, so that both sliding cam pieces can be displaced axially on the main shaft by way of the adjustment element. The sliding cam pieces are connected to the adjustment element in various ways. It is conceivable for the connection to be formed in a form-fitting or force-fitting manner and/or by means of connecting elements, wherein the operation of establishing the connection has to allow for the sliding cam pieces already to be accommodated in the closed bearing bridges of the module body. For example, it is possible for the carrier tubes of the sliding cam pieces to comprise free end portions, and the operation of connecting the first sliding cam piece to the adjustment element is executed preferably by virtue of the end portion of the first carrier tube being inserted into a mount present in the adjustment element. The mount in the adjustment element is formed, for example, by a through-bore which passes through the adjustment element centrally and therefore in the center-axis direction. The free end portion of the first sliding cam piece here is pushed, in particular pressed, into the mount along part of the length of the same. The operation of connecting the second sliding cam piece to the adjustment element is executed, in particular, by virtue of the end portion of the second carrier tube being inserted into the mount, which is present in the adjustment element, the insertion taking place from a side opposite to the free end portion of the first carrier tube.

The order of assembly observed according to the invention in order for the camshaft to be accommodated in a module body which has closed bearing bridges can be utilized particularly advantageously since the sliding cams arranged inserted in the bearing bridges are axially displaceable. Within the framework of the invention, the expression axial displaceability is intended to mean displacement of the sliding cams along the center axis. It is therefore possible for the sliding cam pieces already to be accommodated in the bearing bridges, and the axial displaceability allows the end portions of the carrier tubes to be pushed into the opposite sides of the mount in the adjustment element.

The connection between the sliding cam pieces and the adjustment element is also preferably established in other ways. For example, a sleeve element is guided through the mount in the adjustment element, and the sleeve element is inserted, in particular pressed, into associated mounts in the sliding cam pieces by way of end portions projecting laterally out of the mount. As an alternative, it is conceivable for elements accommodated on the carrier tube of the sliding cam pieces to project axially beyond the carrier tube and thus to form an inner mount, into which the sleeve element can be pressed. This therefore demonstrates a further possible way of establishing a force-fitting and/or force-/form-fitting connection between the sliding cam pieces and the adjustment element.

The end portions are inserted into the mount of the adjustment element preferably to form a press-fit arrangement. For example, a longitudinal press-fit arrangement is established, and it is also possible to establish a transverse press-fit arrangement, for example by virtue of one of the two components involved being heated up and/or cooled. According to an advantageous exemplary embodiment, the mount in the adjustment element is formed by a cylindrical bore which passes through the adjustment element in the axial direction, and the end portions of the carrier bodies may comprise a cylindrical outer lateral surface. It is also preferable, however, for the end portions to comprise a surface profiling, which is plastically deformed, at least in part, when inserted into the mount of the adjustment element. It is further advantageous for the mount to comprise an inner groove structure. In addition, it is conceivable for the surface profiling to be produced by rolling, and therefore the surface profiling comprises circumferentially encircling grooves with valleys and peaks which are arranged concentrically one beside the other and form encircling, parallel rings. The inner groove structure in the mount of the adjustment element is made here by a planing or striking operation, so that the groove structure is axis-parallel to the center axis, and, if the free end portions of the sliding cam pieces are pressed into the mount, the groove structure in the mount causes plastic deformation of the peaks and valleys in the surface structuring of the end portions. This method establishes a force-/form-fitting connection between the sliding cam pieces and the adjustment element which can be subjected to high mechanical loading.

The insertion of the sliding cam pieces in the bearing bridges takes place preferably in various ways. For example, it is conceivable in the first instance for a first cam group to be positioned on, for example pressed onto, a carrier tube in order to form a first sliding cam piece. The assembly made up of the carrier tube and the first cam group is introduced into a closed bearing passage of a bearing bridge, to be precise by way of the free end of the carrier tube, which as yet has no second cam group positioned on it. Thereafter, the second cam group can be positioned on the carrier tube such that that portion of the carrier tube which extends through the bearing passage of the bearing bridge is located between the cam groups. The two cam groups are thus positioned on the carrier tube such that they are arranged spaced apart from one another at in each case a distal end region of the carrier tube.

It is conceivable for the cam groups to be positioned on the carrier tube by virtue of being pressed on or shrunk on, so that the connection between the cam groups and the carrier tube comprises a press-fit arrangement, for example a longitudinal press-fit arrangement or a transverse press-fit arrangement. In particular it is possible for the two sliding cam pieces to be arranged in this way in the associated bearing bridges, wherein the operation of connecting a first sliding cam piece to the adjustment element takes place at different points in time of the installation operation. For example, it is conceivable for a sliding cam piece also to be installed in a first bearing bridge by way of a carrier tube and a first cam group, and by way of an adjustment element already arranged in position, and then a second sliding cam piece can be inserted into an associated second bearing bridge by way of a carrier tube and a cam group. The particular advantage of the method according to the invention resides, irrespective of the assembly sequence, in that the final connection of the two sliding cam pieces via the adjustment element can be executed by at least one of the two sliding cam pieces being displaced axially in the bearing bridge in order to establish the press-fit arrangement with the adjustment element.

The end portions of the carrier tubes can be formed by a portion of the carrier tube which projects axially from a cam group on the outside, the cam group being pushed to a correspondingly pronounced extent onto the carrier tube. In particular, the cam group, as seen in the axial direction, is pushed, in particular pressed, onto the carrier tube to such a pronounced extent that the corresponding end portion projects laterally out of the cam group in the axial direction. If the second cam group is fitted onto the carrier tube, then it can terminate in the axial direction with the end of the carrier tube, since there are no more adjustment elements arranged on the outside.

The end portions can be introduced into the mount of the adjustment element until a respective cam group of the two sliding cam pieces lies laterally against the side surfaces of the adjustment element. This gives rise to a space-saving assembly made up of the sliding cam pieces and the adjustment element.

It is preferably the case that, prior to the sliding cam pieces being joined onto the adjustment element, adjustment takes place of the circumferential position of the sliding cam pieces relative to the circumferential position of the adjustment element about a center axis of the camshaft to a position which is required for valve-control purposes. The respective circumferential position here describes the position of the rotary orientation of the sliding cam pieces in relation to one another and relative to the rotary orientation of the adjustment element about the center axis.

In order to ensure the circumferential position which is required in each case, use is preferably made of a handling system which brings the sliding cam pieces into the correct circumferential position, and retains them in said position, in order then for the sliding cam pieces and the adjustment element to be pressed axially by means of an appropriate pressing method. Once the end portions of the first carrier tube and of the second carrier tube have been introduced into the mount in the adjustment element, the main shaft, finally, is guided through the carrier tubes. For example, two arrangements each comprising two sliding cam pieces and an adjustment element can be accommodated on a main shaft, and therefore the camshaft is designed for controlling the valves of four cylinders, wherein each cylinder is assigned two valves, and the camshaft comprises just two adjustment elements which, for four cylinders of the internal combustion engine, also require just two actuators.

FIGS. 1 to 6 show the method according to the invention, for installing a camshaft 1 in a module body 16, in various installation steps which can follow one after the other, but the method according to the invention is not necessarily limited to the sequence of method steps presented and, in order for the method for installing a camshaft 1 in a module body 16 to be implemented according to the invention, said method steps can also be carried out in a sequence other than that illustrated.

FIG. 1 shows, in order to illustrate a first method step, a schematic view of a module body 16, and the module body 16 comprises a first bearing bridge 17A and a second bearing bridge 17B, and the module body 16 can form a module hood or a cylinder head and it is also possible to provide more than two bearing bridges 17A and 17B, which accommodate further sliding cam pieces 11A, 11B on a main shaft 10.

The bearing bridge 17A has inserted in it a carrier tube 12A, on which a cam group 13A is already fitted. The cam group 13A comprises cam tracks 14 for variable-lift valve control purposes. According to a first variant, in the first instance the carrier tube 12A is introduced into the closed bearing passage 21 of the first bearing bridge 17A, and then the first cam group 13A is pushed onto the carrier tube 12A. According to a second variant, the cam group 13A is already fitted onto the carrier tube 12A outside the module body 16, and then the assembly made up of the carrier tube 12A and the first cam group 13A is guided through the bearing passage 21 of the first bearing bridge 17A.

Figure 2:
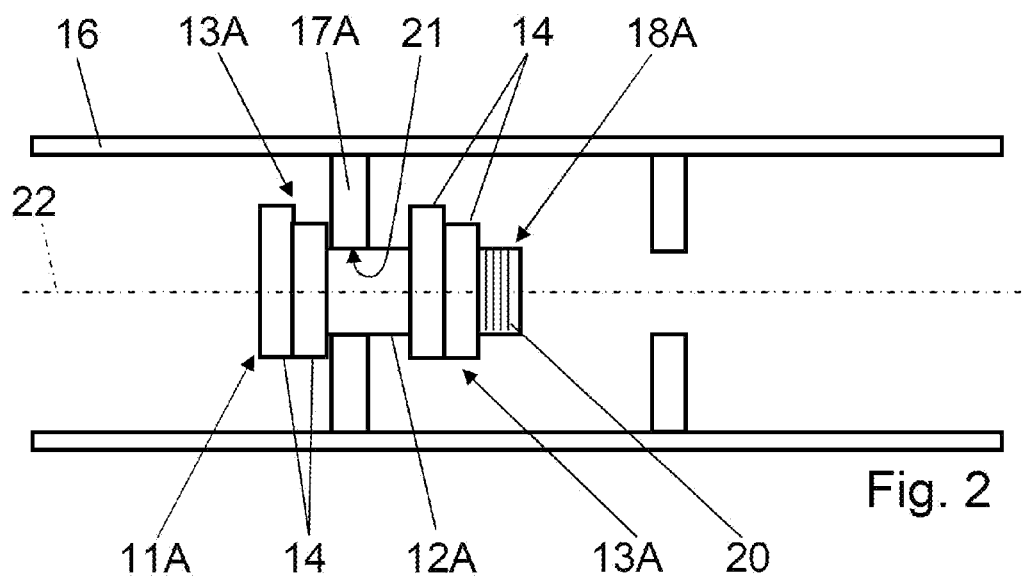
FIG. 2 is a schematic view of an example module body with a carrier tube, a first cam group, and a second cam group.

The carrier tube 12A comprises a surface profiling 20, onto which is fitted, as illustrated in FIG. 2, a second cam group 13A, which is illustrated on the right, in particular a press-fit arrangement being formed in the process. The surface profiling 20 has, in a manner which is not illustrated specifically, a rolled formation, and groove structures can be made in the passages in the cam groups 13A, this making it possible to establish a press-fit connection which is particularly capable of being subjected to loading. A free piece of the carrier tube 12A here extends between the two cam groups 13A and, via said free piece, the sliding cam piece 11A is accommodated in captive fashion in the bearing bridge 17A and is displaced merely over a displacement distance along the center axis 22.

Figure 3:
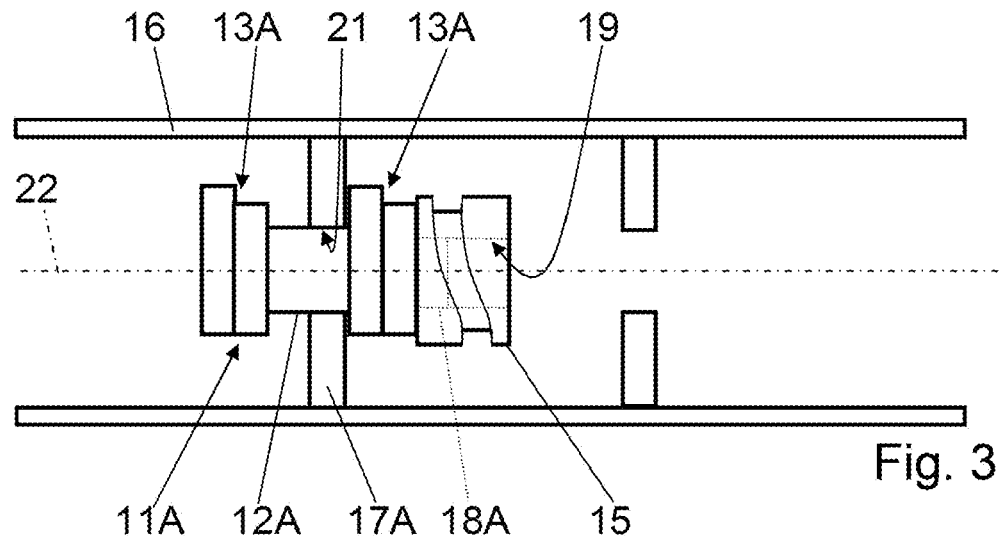
FIG. 3 is a schematic view of an example module body with a first sliding cam piece, on which an adjustment element is disposed.

FIG. 3 shows a further step of the method according to the invention, in which an adjustment element 15 has been supplied and has been positioned on a free end portion 18A of the carrier tube 12A, as shown in FIG. 2. The free end portion 18A likewise comprises a surface profiling 20, see FIG. 2 in this respect, and this undergoes a slight plastic change in shape when the adjustment element 15 is placed in position.

A mount 19 in the form of a through-bore is made in the adjustment element 15, and the first end portion 18A of the carrier tube 12A extends some way into the mount 19.

Figure 4:
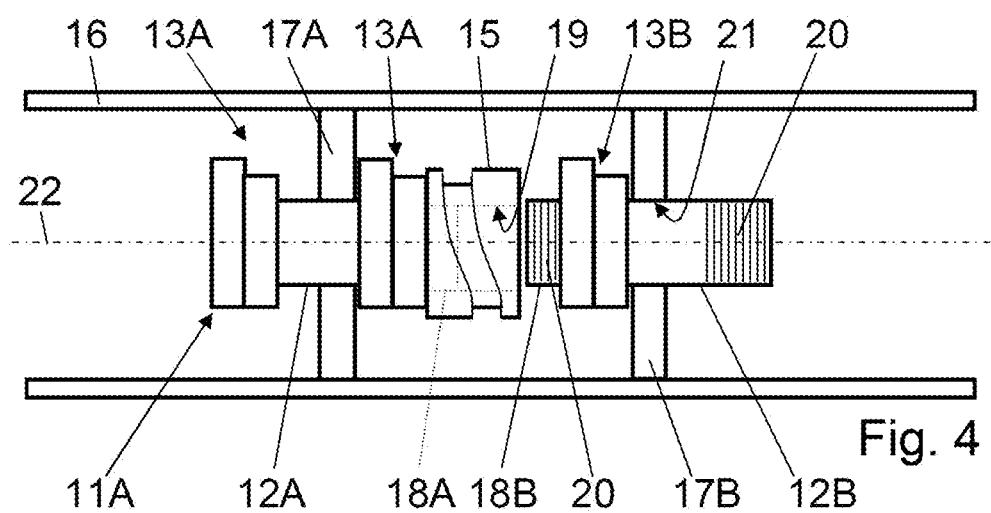
FIG. 4 is a schematic view of an example module body with the first sliding cam piece according to FIG. 3, wherein a second carrier tube with a cam group has been inserted in a second bearing bridge to form a second sliding cam piece.

Proceeding from the finished arrangement of the sliding cam piece 11A in the first bearing bridge 17A, and with the adjustment element 15 attached to the first sliding cam piece 11A, it is the case, as shown in FIG. 4, that the second carrier tube 12B is guided through into the bearing passage 21 of the second bearing bridge 17B, and a cam group 13B is seated, by way of example, on the carrier tube 12B. The second carrier tube 12B likewise has, by way of example, surface profilings 20 for accommodating the further cam group 13B and for forming a structured-surface end portion 18B.

Figure 5:
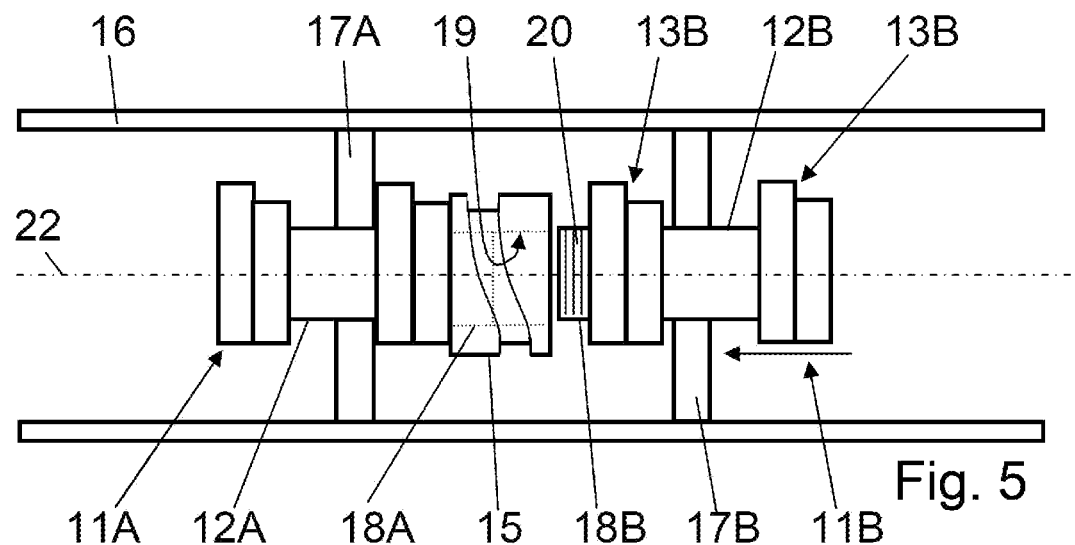
FIG. 5 is a schematic view of the module body of FIG. 4, wherein the second sliding cam piece comprises the carrier tube and a first and a second cam group.

FIG. 5 shows the second sliding cam piece 11B in the completed state, two cam groups 13B having been positioned on the carrier tube 12B, wherein the bearing bridge 17B for accommodating the sliding cam piece 11B is located between the two cam groups 13B. A further free end portion 18B of the second sliding cam piece 11B is shown, and it is also the case that the second end portion 18B comprises, by way of example, a surface profiling 20, by means of which the second end portion 18B is pressed into the mount 19 of the adjustment element 15 from a side opposite to the first end portion 18A, as is indicated by an arrow.

Figure 6:
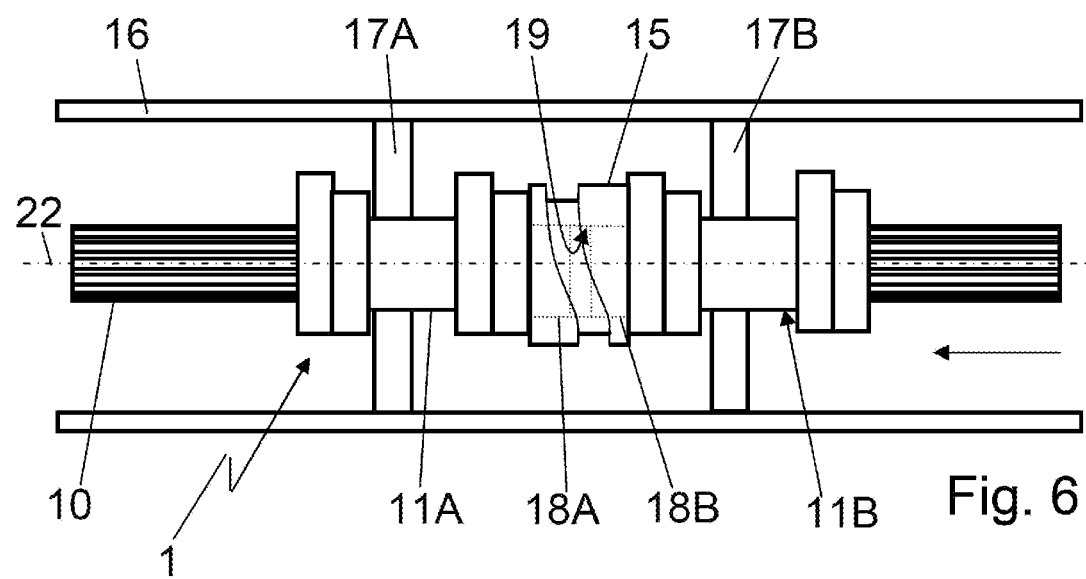
FIG. 6 is a schematic view of an example camshaft in an arrangement installed in a module body, wherein two sliding cam pieces are connected to an adjustment element and wherein a main shaft is guided through the sliding cam pieces.

As FIG. 6 shows, after the end portion 18B has been inserted into the mount 19 of the adjustment element 15, an assembly made up of two sliding cam pieces 11A and 11B with a joint adjustment element 15 is formed, wherein each of the two sliding cam pieces 11A and 11B are accommodated in a rotatable manner in an associated bearing bridge 17A and 17B. Finally, FIG. 6 also shows a main shaft 10 to complete the camshaft 1 arranged in the module body 16, and, as the illustrated arrow shows, the main shaft 10 is guided through the sliding cam pieces 11A and 11B in the direction of the center axis 22.

This all results in an advantageous by implementable assembly method for arranging a camshaft 1 in closed bearing bridges 17A and 17B of a module body 16, wherein the sliding cam pieces 11A and 11B each comprise two outer cam groups 13A and 13B, and the bearing passages 21 are located between the two cam groups 13A and 13B with the associated cam tracks 14.

It is conceivable for the method according to the invention to be implemented to form force-/form-fitting press-fit arrangements by way of a surface profiling 20 on the carrier tube 12A and 12B, wherein the surface profilings 20 both retain the cam groups 13A and 13B on the carrier tubes 12A and 12B in the force-/form-fitting press-fit arrangement and establish the connections between the carrier tubes 12A and 12B and the adjustment element 15 in the force-/form-fitting press-fit arrangement. This gives rise to connections which can be subjected to high mechanical loading, and there is therefore no need for any further in particular integral joining methods, such as welding or soldering, or connecting elements such as screws or the like.

The invention is not restricted in its implementation to the exemplary embodiment given above. Rather, a number of variants which make use of the solution presented, even in the case of fundamentally different types of design, are conceivable. All the features and/or advantages which can be gathered from the claims, from the description or from the drawings, including design details or spatial arrangements, may be essential to the invention both in their own right or in a wide variety of different combinations.

LIST OF REFERENCE SIGNS

1 Camshaft
10 Main shaft
11A Sliding cam piece
11B Sliding cam piece
12A Carrier tube
12B Carrier tube
13A Cam group
13B Cam group
14 Cam track
15 Adjustment element
16 Module body
17A Bearing bridge
17B Bearing bridge
18A End portion
18B End portion
19 Mount
20 Surface profiling
21 Bearing passage
22 Center axis

What is claimed is:

1. A method for assembling a camshaft that comprises a main shaft on which at least two sliding cam pieces are disposed in a rotationally-fixed and axially-displaceable manner, wherein each of the at least two sliding cam pieces comprises cam groups and a respective carrier tube with the cam groups seated on each respective carrier tube, wherein each cam group comprises at least two cam tracks for valve-control purposes, the camshaft further comprising an adjustment element configured to axially displace the at least two sliding cam pieces an axial displacement distance, the method comprising:
providing a module body that has closed bearing bridges for receiving the camshaft in a rotatable manner;
inserting a first sliding cam piece of the at least two sliding cam pieces axially into a first bearing bridge of the closed bearing bridges;
connecting the first sliding cam piece to the adjustment element;
inserting a second sliding cam piece of the at least two sliding cam pieces axially into a second bearing bridge of the closed bearing bridges; and
connecting the second sliding cam piece to the adjustment element so as to permit the at least two sliding cam pieces to move the axial adjustment distance.

2. The method of claim 1 wherein the carrier tubes of the at least two sliding cam pieces comprise free end portions, wherein the connecting of the first sliding cam piece to the adjustment element is executed by way of the free end portion of the carrier tube of the first sliding cam piece being inserted into a mount in the adjustment element.

3. The method of claim 2 wherein the free end portion of the carrier tube of the first sliding cam piece is inserted into the mount in the adjustment element to form a press-fit arrangement.

4. The method of claim 2 wherein the connecting of the second sliding cam piece to the adjustment element is executed by way of the free end portion of the carrier tube of the second sliding cam piece being inserted into the mount of the adjustment element on a side opposite the free end portion of the carrier tube of the first sliding cam piece.

5. The method of claim 4 wherein the free end portions comprise a surface profiling that is plastically deformed at least in part when the free end portions are inserted into the mount of the adjustment element.

6. The method of claim 1 wherein inserting the first sliding cam piece into the first bearing bridge comprises:
positioning a first cam group of the cam groups of the first sliding cam piece on the carrier tube of the first sliding cam piece;
introducing the carrier tube of the first sliding cam piece having the first cam group into a closed bearing passage of the first bearing bridge; and
positioning a second cam group of the cam groups of the first sliding cam piece on the carrier tube of the first sliding cam piece such that a portion of the carrier tube of the first sliding cam piece that extends through the closed bearing passage of the first bearing bridge is positioned between the first and second cam groups.

7. The method of claim 6 wherein inserting the second sliding cam piece into the second bearing bridge comprises:
  positioning a first cam group of the cam groups of the second sliding cam piece on the carrier tube of the second sliding cam piece;
  introducing the carrier tube of the second sliding cam piece having the first cam group into a closed bearing passage of the second bearing bridge; and
  positioning a second cam group of the cam groups of the second sliding cam piece on the carrier tube of the second sliding cam piece such that a portion of the carrier tube of the second sliding cam piece that extends through the closed bearing passage of the second bearing bridge is positioned between the first and second cam groups of the second sliding cam piece.

8. The method of claim 1 wherein the carrier tubes of the at least two sliding cam pieces comprise free end portions, the method further comprising pushing one of the cam groups from each of the at least two sliding cam pieces, respectively, onto the carrier tubes to pronounced extents such that the free end portion of each carrier tube is formed by a portion of the carrier tube that projects from the cam groups pushed onto the carrier tubes.

9. The method of claim 1 wherein the carrier tubes of the at least two sliding cam pieces comprise free end portions, wherein the connecting of the first sliding cam piece to the adjustment element is executed by way of the free end portion of the carrier tube of the first cam sliding piece being inserted into a mount in the adjustment element, the method further comprising introducing the free end portion of the first sliding cam piece into the mount in the adjustment element until one of the cam groups of the first sliding cam piece lies laterally against a first side surface of the adjustment element.

10. The method of claim 9 wherein the connecting of the second sliding cam piece to the adjustment element is executed by way of the free end portion of the carrier tube of the second cam sliding piece being inserted into the mount in the adjustment element, the method further comprising introducing the free end portion of the second sliding cam piece into the mount in the adjustment element until one of the cam groups of the second sliding cam piece lies laterally against a second side surface of the adjustment element that is opposite the first side surface.

11. The method of claim 1 wherein before the first and second sliding cam pieces are connected to the adjustment element, the method further comprises adjusting circumferential positions of the first and second sliding cam pieces relative to a circumferential position of the adjustment element about a center axis of the camshaft that is required for valve-control purposes.

12. The method of claim 1 wherein the carrier tubes of the at least two sliding cam pieces comprise free end portions, the method further comprising guiding the main shaft through the carrier tubes after the free end portions are introduced into a mount in the adjustment element.

13. A camshaft comprising:
  a main shaft;
  a first sliding cam piece disposed on the main shaft in a rotationally-fixed and axially-displaceable manner, wherein the first sliding cam piece extends through a first bearing bridge, wherein the first sliding cam piece comprises cam groups seated on a carrier tube, wherein each of the cam groups of the first sliding cam piece comprises at least two cam tracks for valve-control purposes;
  a second sliding cam piece disposed on the main shaft in a rotationally-fixed and axially-displaceable manner, wherein the second sliding cam piece extends through a second bearing bridge, wherein the second sliding cam piece comprises cam groups seated on a carrier tube, wherein each of the cam groups of the second sliding cam piece comprises at least two cam tracks for valve-control purposes; and
  a single, one-piece adjustment element configured to axially displace the first and second sliding cam pieces, wherein the first and second sliding cam pieces are connected to opposite ends of the adjustment element.

14. The camshaft of claim 13 wherein the first and second sliding cam pieces are connected to the adjustment element by way of end portions of the first and second sliding cam pieces that are disposed within a mount in the adjustment element.

15. The camshaft of claim 14 wherein the end portion of each of the first and second sliding cam pieces is disposed in the mount in the adjustment element in a press-fit manner.

16. The camshaft of claim 14 wherein the end portions comprise a surface profiling that is plastically deformed at least in part due to insertion of the end portions into the mount of the adjustment element.

17. The camshaft of claim 13 wherein the adjustment element is disposed between the first and second bearing bridges.

18. The camshaft of claim 13 wherein the end portions of the first and second sliding cam pieces are positioned between the first and second bearing bridges.

19. The camshaft of claim 13 wherein one of the cam groups of each of the first and second sliding cam pieces abuts the adjustment element.

* * * * *